No. 726,355. PATENTED APR. 28, 1903.
J. C. SCHAEFER.
PRESSURE REGULATING VALVE.
APPLICATION FILED MAR. 18, 1902.
NO MODEL. 2 SHEETS—SHEET 1.
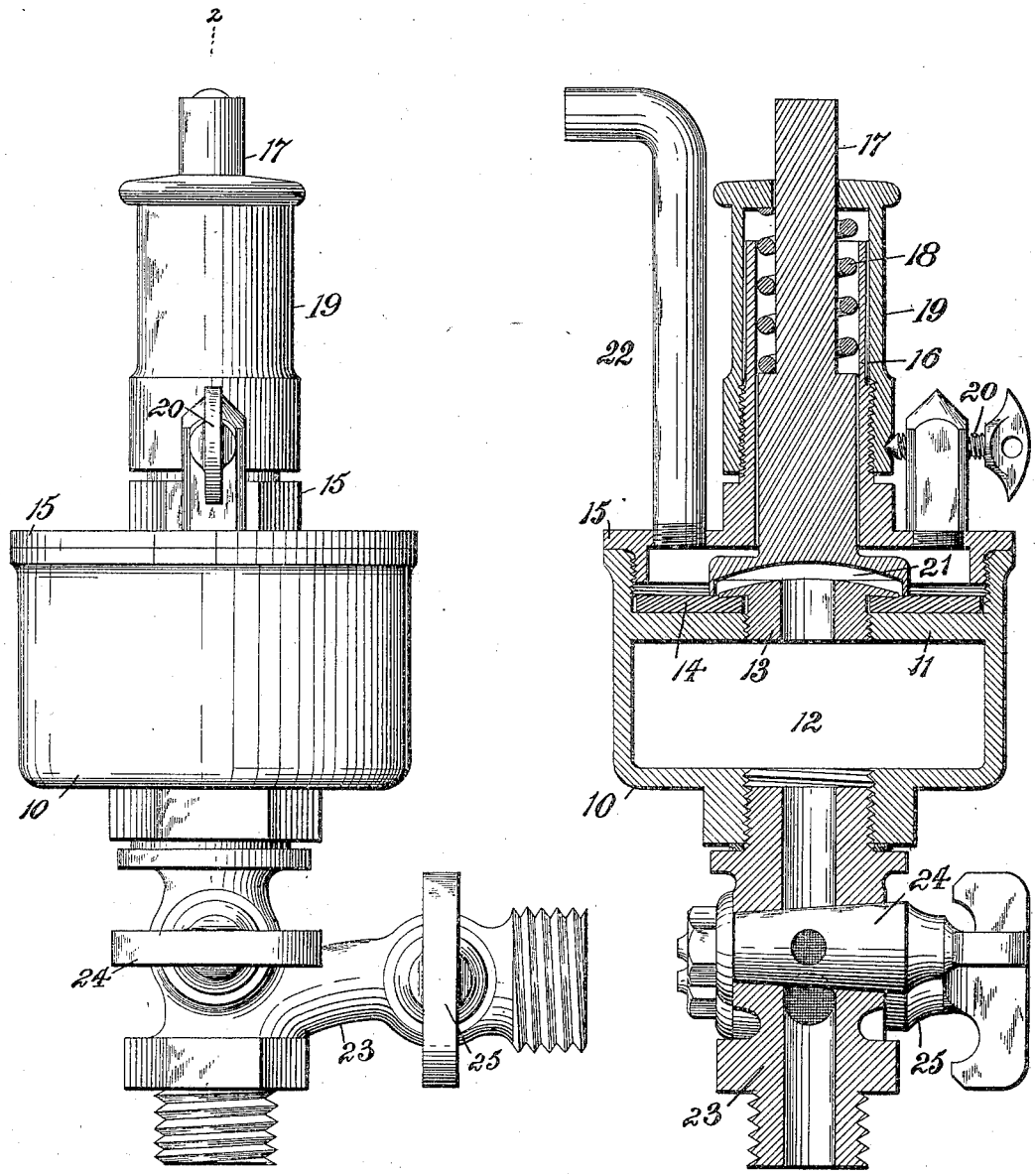

No. 726,355. PATENTED APR. 28, 1903.
J. C. SCHAEFER.
PRESSURE REGULATING VALVE.
APPLICATION FILED MAR. 18, 1902.
NO MODEL.
2 SHEETS—SHEET 2.

WITNESSES:
Louise C. Müller
Ella C. Sheridan.

INVENTOR
John C. Schaefer,
BY
Wm H. Campbell Jr. ATTORNEY.

UNITED STATES PATENT OFFICE.

JOHN C. SCHAEFER, OF NEW YORK, N. Y.

PRESSURE-REGULATING VALVE.

SPECIFICATION forming part of Letters Patent No. 726,355, dated April 28, 1903.

Application filed March 18, 1902. Serial No. 98,765. (No model.)

*To all whom it may concern:*

Be it known that I, JOHN C. SCHAEFER, a citizen of the United States, residing in the city of New York, county and State of New York, have invented certain new and useful Improvements in Pressure-Regulating Valves; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a pressure-regulating valve, easily adjusted, that allows of a quick escape and a prompt reclosing when the pressure falls to the adjusted limit. The device is applicable to all uses to which valves of this class are put, but is particularly adapted to casks containing fermenting extracts, and more particularly to casks in breweries.

In the manufacture of beer, &c., the first fermentation takes place in open vats, and after the necessary time has elapsed young beer and yeast are added, and this or "kraeusen" beer is placed into closed tanks and sealed, and as the beer ferments certain pressures must be maintained, and to maintain these this valve is devised.

Figure 3:
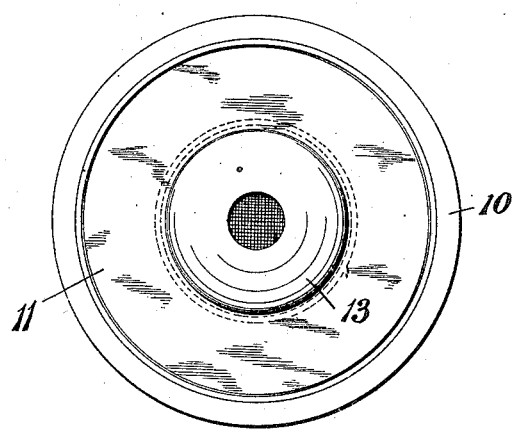
Figure 4:
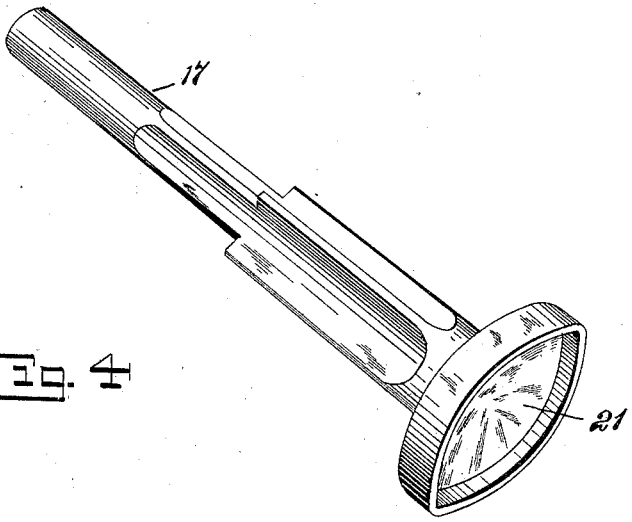

In the drawings, Figure 1 is a side elevation, and Fig. 2 a section on line 2 2 in Fig. 1. Fig. 3 is a plan with the cap removed, and Fig. 4 is a perspective of the valve-stem.

In the drawings, 10 is a casing inclosing in connection with the web 11 an auxiliary chamber 12, and screwed into this web is the valve-seat and gasket-holding nipple 13. The gasket 14 rests on the web. On the casing 10 is screwed a cap 15, which is provided with a sleeve 16, which in turn receives the valve-stem 17. This stem has a shoulder which receives the pressure of a spring 18, the other end of the spring bearing against a pressure-regulating sleeve 19, and when adjusted this sleeve is held by the screw 20, as will be evident. The end of the valve-stem 17 is enlarged beyond the diameter of the valve-seat 13 and provided with a concavity which forms a chamber 21, the circumferential edge resting on the gasket, as in Fig. 2 and the dotted lines in Fig. 3. The casing is screwed onto a two-way valve 23, provided with the cocks 24 and 25, the uses of which will be described hereinafter.

The device, as shown, is screwed by means of the valve 23, so that the cock 24 is between the cask and the pressure-regulating valve. When the cask or vat is filled, the cock 24 is opened and the cock 25 is closed. By screwing the sleeve 19 the pressure predetermined can be maintained and the spring keeps the valve shut. As the beer or other liquor ferments the gases collect in the auxiliary chamber 12 and under the valve-stem 17 in the small chamber 21 until the gases have enough pressure to force the stem upward, which allows of a quick escape from the space 21 out through a suitable outlet 22, and the valve will immediately close. When the beer, &c., has fermented sufficiently, the cock 24 can be closed, the cock 25 opened and connected with the air-pressure, when the beer can be "racked off." Then the cask is refilled, the cock 25 closed, 24 opened, and the valve is again operative. I have thus devised a valve of a simple form that can be easily adjusted and that opens and allows of a quick escape of the gas and closes with corresponding rapidity.

The auxiliary chamber and the small chamber formed under the stem of the valve allow a collection of the gases, and as the valve opens a comparatively large area the pressure is relieved quickly, and this in turn allows of a corresponding replacement of the valve.

I have described the valve as adapted to vats in breweries, &c.; but it may be used in any way to which a valve of this character is applicable.

Having thus described my invention, what I claim is—

1. In a pressure-regulating valve, a casing and web inclosing a chamber, an inlet thereto, a gasket on said web, a perforated nipple screwed into the web, and holding the gasket, a cap on the casing, an adjustable sleeve on said cap inclosing a spring-actuated valve-stem, said stem having an enlarged lower end in engagement with the gasket, and an outlet-pipe on said cap, substantially as set forth.

2. A pressure-regulating valve, comprising a chamber provided with a web, a perforated nipple holding a gasket on the upper side of the web, said nipple having a convex upper surface, a spring-actuated valve-stem having its lower end encircling the nipple and resting on the gasket, the said lower end being concave to form a chamber between the nipple and the stem, substantially as set forth.

3. A pressure-regulating valve, comprising a chamber provided with a web dividing it into two compartments, said web having a perforation, a gasket on said web having a perforation, a perforated nipple in said web screwed into said perforations and clasping the gasket and web together, a cap on the casing, an adjustable sleeve on said cap inclosing a spring-actuated valve-stem, said stem having an enlarged concave lower end in engagement on its edges with the gasket and bridging the nipple, an inlet-pipe leading to the lower compartment and an outlet-pipe from the upper compartment.

In testimony that I claim the invention set forth above I have hereunto set my hand this 2d day of January, 1902.

JOHN C. SCHAEFER.

Witnesses:
WM. H. CAMFIELD, Jr.,
LOUISE C. MÜLLER.